(12) United States Patent
Thorsen et al.

(10) Patent No.: US 8,075,770 B2
(45) Date of Patent: Dec. 13, 2011

(54) FLOTATION DEVICE

(76) Inventors: Liv Thorsen, Langesund (NO); Karl Erik Larsen, Porsgrunn (NO); Udo Müller, Stavern (NO)

( * ) Notice: Subject to any disclaimer, the term of this patent is extended or adjusted under 35 U.S.C. 154(b) by 0 days.

(21) Appl. No.: 12/515,500

(22) PCT Filed: Nov. 16, 2007

(86) PCT No.: PCT/NO2007/000405
§ 371 (c)(1),
(2), (4) Date: Jan. 14, 2010

(87) PCT Pub. No.: WO2008/063074
PCT Pub. Date: May 29, 2008

(65) Prior Publication Data
US 2010/0126925 A1    May 27, 2010

(30) Foreign Application Priority Data

Nov. 20, 2006   (NO) .................................. 20065307

(51) Int. Cl.
*C02F 1/24* (2006.01)
(52) U.S. Cl. ........................................ 210/221.2
(58) Field of Classification Search ............... 210/221.2, 210/221.1
See application file for complete search history.

(56) References Cited

U.S. PATENT DOCUMENTS

| | | | | |
|---|---|---|---|---|
| 1,494,670 A | * | 5/1924 | Delaney et al. | 210/535 |
| 3,884,803 A | * | 5/1975 | Traylor | 210/704 |
| 4,190,522 A | * | 2/1980 | Tra | 209/170 |
| 4,564,457 A | * | 1/1986 | Cairo et al. | 209/170 |
| 4,782,789 A | * | 11/1988 | Canzoneri | 210/703 |
| 4,889,638 A | * | 12/1989 | Rockford et al. | 210/703 |
| 4,952,308 A | | 8/1990 | Chamberlin et al. | |
| 5,240,621 A | | 8/1993 | Elonen et al. | |
| 5,273,624 A | | 12/1993 | Chamberlin et al. | |
| 5,759,408 A | | 6/1998 | Järvenpää | |

(Continued)

FOREIGN PATENT DOCUMENTS

EP    0 271 427    6/1988

(Continued)

OTHER PUBLICATIONS

International Search Report issued Jul. 11, 2008 in the International (PCT) Application of which the present application is the U.S. National Stage.

(Continued)

*Primary Examiner* — Thomas M Lithgow
(74) *Attorney, Agent, or Firm* — Wenderoth, Lind & Ponack, LLP

(57) ABSTRACT

A flotation device for the separation (purification or removal) of dispersed particles in a fluid, in particular removal of dispersed oil in water. The device includes a flotation cell (1) with one or more nozzles (4) provided at or near the bottom of the cell for the supply of gas or fluid to the interior of the cell. The cell is provided with an inlet (5) for the fluid to be treated and two or more outlets (6, 7) for the separated products. The flotation cell is in the form of a longitudinal pipe (1), the diameter of which is basically the same as the diameter of the fluid transport or feeding pipe (2) connected to the inlet (5) of the pipe. The nozzles (4) for the supply of gas or fluid are provided at a distance along the bottom of the pipe.

10 Claims, 3 Drawing Sheets

U.S. PATENT DOCUMENTS 5,904,840 A * 5/1999 DiBella .......................... 210/85
2005/0006086 A1 * 1/2005 Gramme .................... 166/105.5

FOREIGN PATENT DOCUMENTS

| RU | 1835388 | 8/1993 |
|---|---|---|
| WO | 2007/074379 | 7/2007 |

OTHER PUBLICATIONS

Patent Cooperation Treaty (PCT) Written Opinion of the International Searching Authority in corresponding International Application No. PCT/NO2007/000405.

* cited by examiner

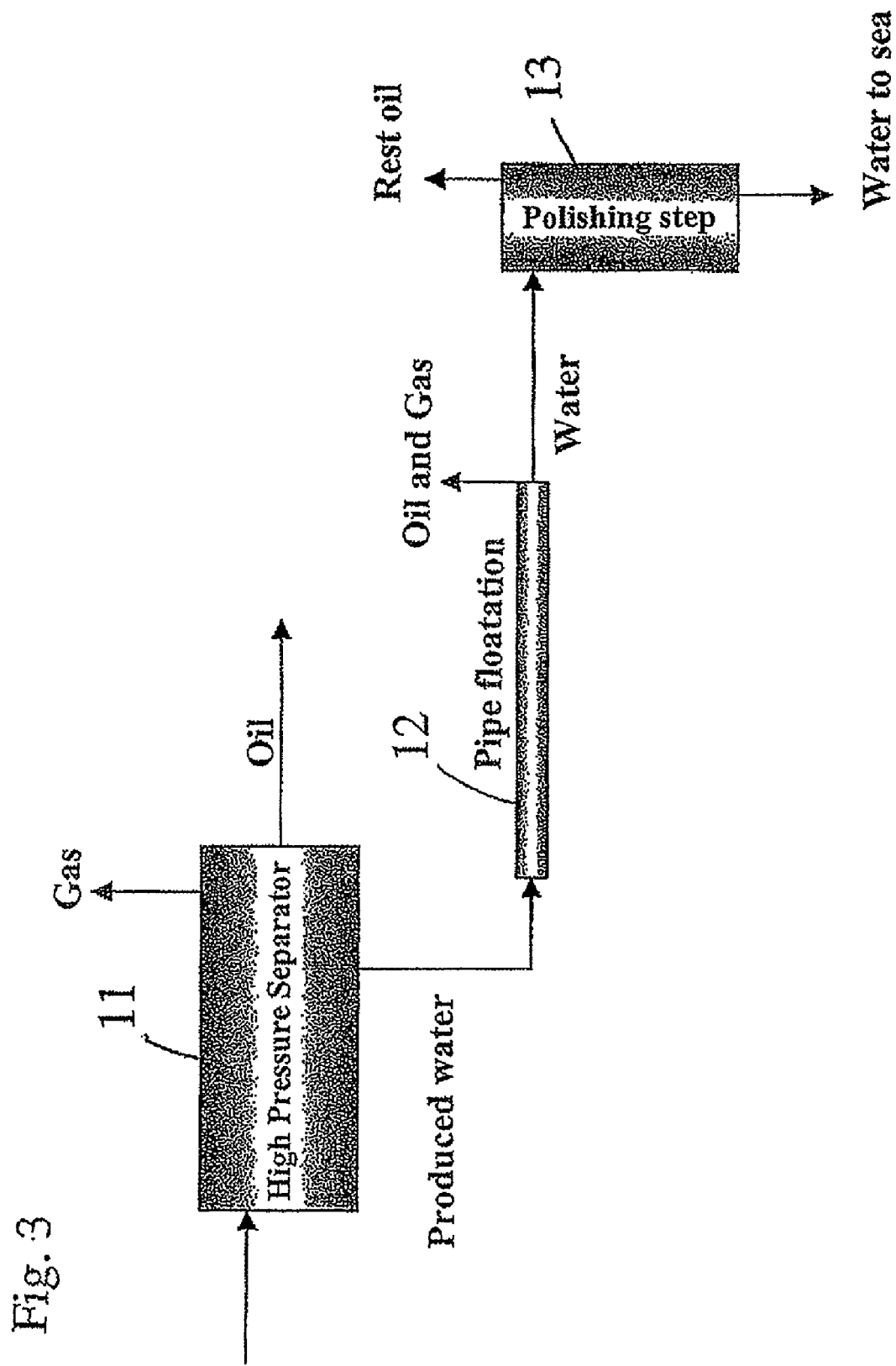

FLOTATION DEVICE

BACKGROUND OF THE INVENTION

1. Technical Field

The present invention relates to a flotation device for the removal of dispersed particles in a fluid, in particular removal of dispersed oil in water.

2. Description of the Related Art

When producing oil and gas from geological formations beneath the sea bed and the ground, considerable quantities of water may also be produced. In professional circles this is called "produced water". Apart from dispersed oil, this water also contains various types of dissolved hydrocarbon in addition to dissolved metals and other chemical substances. Produced water is generally dumped, i.e., in connection with offshore production of oil and gas, discharged into the sea.

Regarding the content of dispersed oil in dumped water, the authorities in the various countries have set discharge requirements that must be met by the oil companies producing oil and gas. In the Norwegian sector of the North Sea and the Norwegian Sea, this requirement is currently 30 ppm oil for produced water. Future requirements are, however, expected to be lower than 30 ppm.

There are currently no specific discharge requirements for dissolved hydrocarbons (HC), but statements by the authorities indicate background level discharge requirements.

Existing technology for the removal of dispersed hydrocarbons from produced water normally includes a first step gravitational separator, a flocculation tank and a first step hydro cyclone, a second step separator, a second step hydro cyclone and a degassing tank. Such known equipment is very comprehensive with many components and is both expensive to manufacture and operate.

BRIEF SUMMARY OF THE INVENTION

With the present invention is provided a simple, effective and inexpensive device for the removal of dispersed particles from a liquid, especially removal of dispersed oil from produced water.

BRIEF DESCRIPTION OF THE DRAWINGS

The invention will be further described in the following by way of example and by means of the figures where:

FIG. 3 is a schematic illustration of an embodiment of the flotation device shown in FIG. 1, but being used, as an example, in connection with the purification of produced water when producing oil and gas.

DETAILED DESCRIPTION OF THE INVENTION

Flotation is, since the beginning of the 19$^{th}$ century, a commonly known method for the concentration of materials in suspensions and separation of particles from liquids. The flotation takes place in a flotation cell, including a chamber or vessel with one or more nozzles in the bottom for the supply of air or gas. Bubbles generated by the nozzle(s) attach to the particles and float to the top of the liquid, whereby the particles may be skimmed, drained off or in other ways removed from the surface of the liquid. Flotation may, in some situations, also be accomplished by lowering the pressure of the liquid thereby releasing saturated gas in the liquid.

Figure 1:
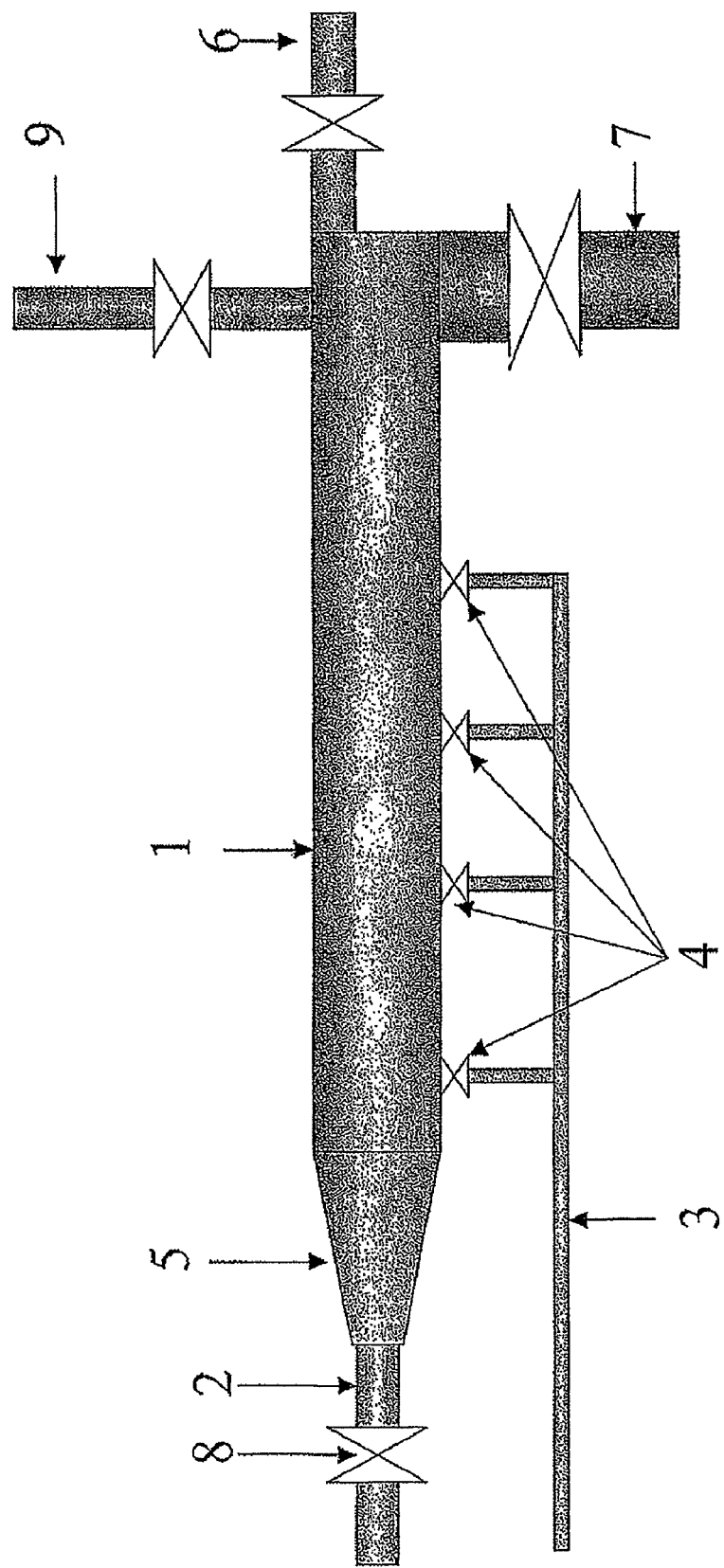
FIG. 1 is a schematic illustration of a flotation device according to the present invention.

The present invention is based on the principle of flotation; however, the "cell" is, as is shown in FIG. 1, in the form of a longitudinal pipe 1 where the diameter of the inlet 5 of the pipe basically corresponds to the diameter of the fluid supply pipe 2. Gas or a combination of gas and fluid is supplied to the flotation pipe 1 from a source (not shown) via gas supply pipes 3 through nozzles 4 provided at a distance from one another along the bottom of the floatation pipe 1. Further, liquid is evacuated from the flotation pipe 1 through a lower outlet 7 and particles and gas are evacuated from the flotation pipe preferably through an upper outlet 6, 9.

The simple working principle of the present invention is as follows: A fluid containing particles is supplied to the flotation pipe 1 through the fluid supply pipe 2. At the same time gas or liquid saturated with gas is supplied to the nozzles from a source (not shown), whereby the gas bubbles from the cross-flowing gas will attach to the particles in the fluid flow in the pipe and speedily float to the surface of the fluid. The particles are brought with the fluid flow to the end of the pipe where they together with the gas are evacuated from the pipe through the outlet pipe 6, while the liquid is evacuated through the outlet pipe 7.

With the floatation device, as described above, is provided an efficient and compact solution for the concentration of materials in suspensions and separation of particles from liquids. The solution is efficient as the retention time for the liquid is short, 1.25-5 minutes for oil in water, compared with 20-40 minutes for a conventional flotation tank. The dimensions are also very small, thus the diameter of the flotation pipe may preferably be 1-4 times the diameter of the transport pipe transporting the fluid to the device, whereas a conventional floatation tank may be more than 10 times the diameter of the supply or transport pipe.

The solution has many applications and may, beyond being used for the removal of dispersed oil in produced water, also be used for instance in biological water cleaning systems and any process for the removal of dispersed particles in a liquid.

Figure 2:
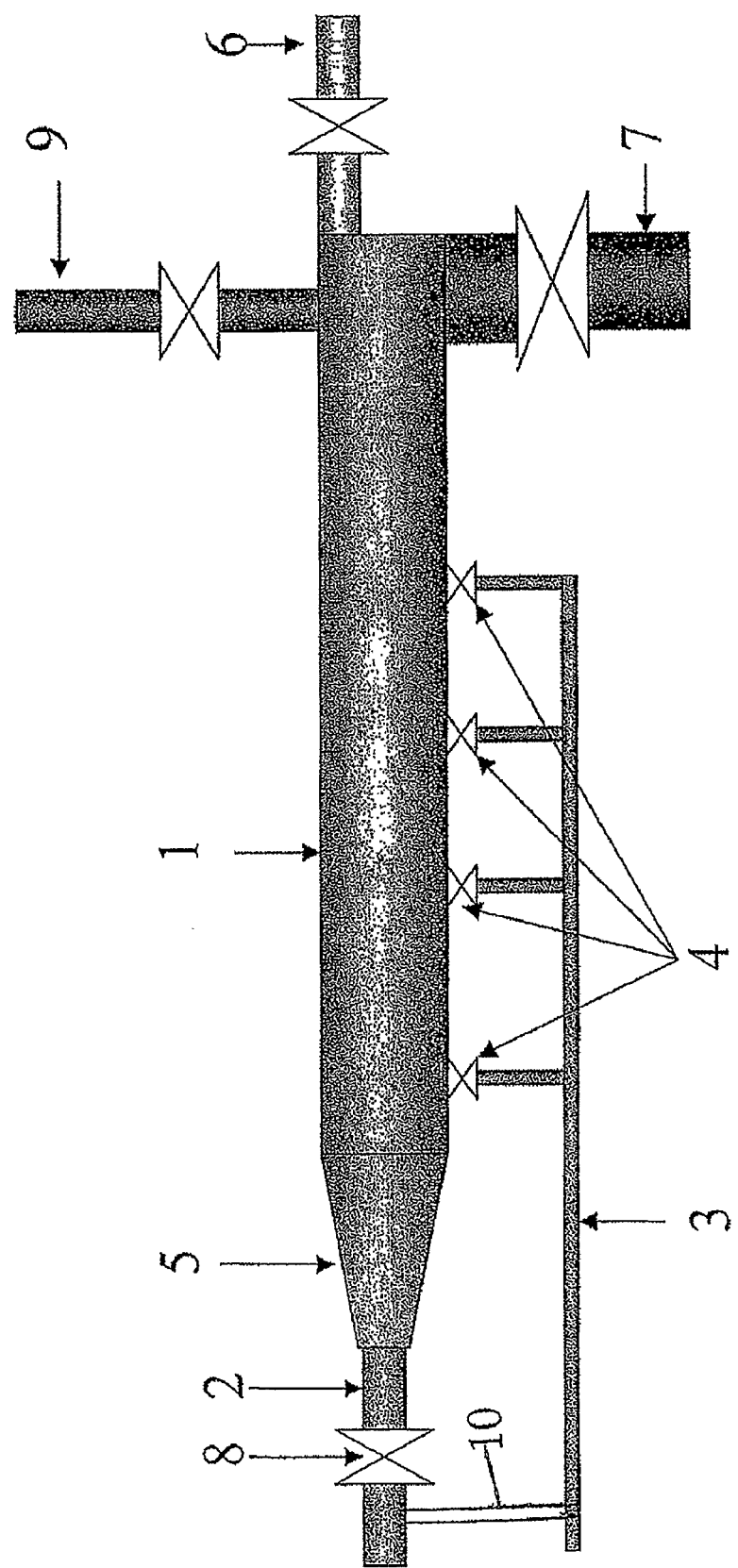
FIG. 2 is a schematic illustration of another embodiment of a flotation device according to the present invention.

FIG. 2 shows another embodiment where the flotation device according to the invention is used to purify produced water in connection with the production of oil and gas. When producing oil and gas the produced water will contain saturated gas at a higher pressure. As can be seen from the figure, a pressure reduction valve 8 is provided at the inlet end of the flotation pipe reducing the pressure of the fluid (water containing dispersed oil) before entering the pipe. The pressure reduction accomplished by the valve 8 results as such in the creation of bubbles in the produced water and oil droplets flowing through the pipe. A separate pipe 10 connects the nozzles 4 with the supply pipe 2 prior to the valve 8 thereby providing a partial flow of the produced water to the nozzles. Upon entering the flotation pipe through the nozzles, the gas in the form of bubbles will be released from the water, and the thus released gas bubbles in addition to the bubbles released after passing the valve, will attach to the dispersed oil and together float to the surface as described above.

By using a flotation cell in the form of a pipe as described above, many advantages are apparent:

The flotation path for the particles in the fluid is very short (short distance from top to bottom in the pipe) and the flotation process is therefore very speedy.

The speed of the fluid in the flotation pipe 1 is relatively high compared with a conventional flotation cell, and the cross flow provided by the gas or gas/liquid supplied from the nozzles in the bottom generate more collisions between the gas bubbles and particles in the fluid flow through the flotation pipe resulting in improved coalescence.

The velocity of the gas phase in the flotation pipe is higher than the liquid phase, whereby the creation of foam is reduced or the foam created is more speedily broken down.

A pipe is less space consuming and lighter than an ordinary flotation tank and is therefore more applicable in situations, for instance on platforms off-shore, where space and weight is valuable.

A pipe withstands higher pressures on the inside as well as the outside and may be used in situations where high pressures are required such as in sub-sea processing systems. Further, since a pipe withstands higher inside pressure, the flotation process may take place at higher pressure, for instance by using natural gas as flotation gas.

FIG. 3 shows an example of a process for the separation of a produced fluid (oil/gas/water) and purification of produced water in connection with the production of oil and gas where the flotation device according to the invention is used. The produced fluid arrives from a well(s) (not shown) and is initially separated in a high pressure gravitational separator 11 (conventional or pipe). Gas is evacuated from the separator through a gas outlet to a suitable gas destination (not shown), the separated oil is evacuated through an oil outlet to another destination (not shown), while the produced water is passed to a flotation device 12 according to the invention.

The gas and dispersed oil separated from the produced water by the flotation device may be transported to a site for further processing (not shown), whereas the water is passed to a suitable polishing step 13 to remove the dissolved oil (hydrocarbons).

The invention claimed is:

1. A flotation device for the separation of dispersed particles in a fluid to be treated, the flotation device including:
   a flotation cell with one or more nozzles provided at or near a bottom of the flotation cell for the supply of gas or fluid to an interior of the flotation cell;
   an inlet structure, connected to the flotation cell, for the fluid to be treated;
   two or more outlets for separated products; and
   a fluid transport or feeding pipe connected to the inlet structure,
   wherein the flotation cell is in the form of a cylindrical longitudinal pipe, the diameter of which is one to four times the diameter of the fluid transport or feeding pipe connected to the inlet structure of the cylindrical longitudinal pipe, and the nozzles are spaced at intervals along the bottom of the pipe.

2. The flotation device according to claim 1, wherein the cylindrical longitudinal pipe has a circular cross section.

3. The flotation device according to claim 1, wherein a reduction valve is provided upstream of the inlet structure.

4. The flotation device according to claim 1, wherein the fluids provided to the nozzles are supplied from the transport or feeding pipe via a pipe connected to the transport or feeding pipe upstream of a reduction valve.

5. The flotation device according to claim 1, wherein the cylindrical longitudinal pipe has a constant circular cross section along the length thereof.

6. A flotation device for the separation and removal of dispersed oil in water, the flotation device including:
   a flotation cell with one or more nozzles provided at or near a bottom of the flotation cell for the supply of gas or fluid to an interior of the flotation cell;
   an inlet structure connected to the flotation cell;
   two or more outlets for separated products; and
   a fluid transport or feeding pipe connected to the inlet structure,
   wherein the flotation cell is in the form of a cylindrical longitudinal pipe, the diameter of which is one to four times the diameter of the fluid transport or feeding pipe connected to the inlet structure of the cylindrical longitudinal pipe, and the nozzles are spaced at intervals along the bottom of the cylindrical longitudinal pipe.

7. The flotation device according to claim 6, wherein the longitudinal pipe has a circular cross section.

8. The flotation device according to claim 6, wherein a reduction valve is provided upstream of the inlet of the flotation cell.

9. The flotation device according to claim 6, wherein the fluids provided to the nozzles are supplied from the transport or feeding pipe via a pipe connected to the transport pipe or feeding pipe upstream of a reduction valve.

10. The flotation device according to claim 6, wherein the cylindrical longitudinal pipe has a constant circular cross section along the length thereof.

\* \* \* \* \*